(12) United States Patent
Ruggiero et al.

(10) Patent No.: US 7,905,208 B2
(45) Date of Patent: *Mar. 15, 2011

(54) VALVE BRIDGE WITH INTEGRATED LOST MOTION SYSTEM

(75) Inventors: Brian Ruggiero, East Granby, CT (US); Neil Fuchs, New Hartford, CT (US); Zhou Yang, South Windsor, CT (US); Robb Janak, Colebrook, CT (US)

(73) Assignee: Jacobs Vehicle Systems, Inc., Bloomfield, CT (US)

( * ) Notice: Subject to any disclaimer, the term of this patent is extended or adjusted under 35 U.S.C. 154(b) by 339 days.

This patent is subject to a terminal disclaimer.

(21) Appl. No.: 11/079,249

(22) Filed: Mar. 15, 2005

(65) Prior Publication Data

US 2005/0211206 A1 Sep. 29, 2005

Related U.S. Application Data

(60) Provisional application No. 60/552,745, filed on Mar. 15, 2004.

(51) Int. Cl.
*F01L 1/26* (2006.01)

(52) U.S. Cl. ............... 123/90.22; 123/90.12; 123/90.39; 123/90.4; 123/90.45; 74/569

(58) Field of Classification Search ............... 123/90.12, 123/90.13, 90.39, 90.44, 90.16, 90.2, 90.22, 123/90.4, 90.41, 90.45, 90.46; 74/559, 567, 74/569

See application file for complete search history.

(56) References Cited

U.S. PATENT DOCUMENTS

| | | | |
|---|---|---|---|
| 4,572,114 A | 2/1986 | Sickler | |
| 4,592,319 A | 6/1986 | Meistrick | |
| 4,887,562 A * | 12/1989 | Wakeman | 123/90.12 |
| 4,924,821 A | 5/1990 | Teerman | |
| 4,930,465 A * | 6/1990 | Wakeman et al. | 123/90.12 |
| 5,531,192 A | 7/1996 | Feucht et al. | |
| 5,680,841 A * | 10/1997 | Hu | 123/322 |
| 5,996,550 A * | 12/1999 | Israel et al. | 123/322 |

(Continued)

FOREIGN PATENT DOCUMENTS

DE 19858213 6/2000

(Continued)

OTHER PUBLICATIONS

Hope A. Bolton and Jay M. Larson, Valvetrain System Design and Materials, "A Chronology of Hydraulic Lash Compensation in the United States" by W.A. Dammers (Eaton Corporation, Marshall, Michigan), International Symposium on Valvetrain System Design and Materials, Apr. 14-15, 1997, pp. 27-41, ASM International, Materials Park, Ohio, United States of America.

*Primary Examiner* — Ching Chang
(74) *Attorney, Agent, or Firm* — David R. Yohannan; Kelley Drye & Warren LLP

(57) ABSTRACT

A system and method of actuating one or more engine valves is disclosed. In one embodiment, the system comprises: a valve train element; a rocker arm pivotally mounted on a shaft and adapted to rotate between a first position and a second position, the rocker arm selectively receiving motion from the valve train element; a valve bridge disposed above the one or more engine valves; and a lost motion system disposed in the valve bridge.

30 Claims, 12 Drawing Sheets

U.S. PATENT DOCUMENTS

| | | | |
|---|---|---|---|
| 6,000,374 A * | 12/1999 | Cosma et al. | 123/321 |
| 6,006,706 A | 12/1999 | Zanzaki | |
| 6,085,705 A | 7/2000 | Vorih | |
| 6,257,183 B1 * | 7/2001 | Vorih et al. | 123/90.12 |
| 6,293,248 B1 * | 9/2001 | Zsoldos et al. | 123/321 |
| 6,321,701 B1 * | 11/2001 | Vorih et al. | 123/90.12 |
| 6,386,160 B1 * | 5/2002 | Meneely et al. | 123/90.16 |
| 6,412,457 B1 * | 7/2002 | Vorih et al. | 123/90.12 |
| 6,415,752 B1 * | 7/2002 | Janak | 123/90.12 |
| 6,474,296 B2 * | 11/2002 | Cornell et al. | 123/321 |
| 6,477,997 B1 * | 11/2002 | Wakeman | 123/90.16 |
| 6,647,954 B2 * | 11/2003 | Yang et al. | 123/321 |
| 6,883,492 B2 * | 4/2005 | Vanderpoel et al. | 123/321 |
| 7,673,600 B2 * | 3/2010 | Yang | 123/90.16 |

FOREIGN PATENT DOCUMENTS

| | | |
|---|---|---|
| WO | 9602739 | 2/1996 |
| WO | 9834014 | 8/1998 |

* cited by examiner

VALVE BRIDGE WITH INTEGRATED LOST MOTION SYSTEM

CROSS-REFERENCE TO RELATED APPLICATION

This application relates to and claims priority on U.S. Provisional Application No. 60/552,745, filed Mar. 15, 2004 and entitled "Valve Bridge With Integrated Lost Motion System," a copy of which is incorporated herein by reference in its entirety.

FIELD OF THE INVENTION

The present invention relates generally to systems and methods for actuating one or more engine valves in an internal combustion engine. In particular, the invention relates to systems and methods for valve actuation including a lost motion system. Embodiments of the present invention may be used during positive power, engine braking, and/or exhaust gas recirculation operation of an internal combustion engine.

BACKGROUND OF THE INVENTION

Valve actuation in an internal combustion engine is required in order for the engine to produce positive power, and may also be used to produce auxiliary valve events, such as engine braking, and exhaust gas recirculation (EGR). During positive power, intake valves may be opened to admit fuel and air into a cylinder for combustion. One or more exhaust valves may be opened to allow combustion gas to escape from the cylinder. Intake, exhaust, and/or auxiliary valves may also be opened during positive power at various times to recirculate gases for improved emissions.

Engine valve actuation also may be used to produce engine braking and exhaust gas recirculation when the engine is not being used to produce positive power. During engine braking, one or more exhaust valves may be selectively opened to convert, at least temporarily, the engine into an air compressor. In doing so, the engine develops retarding horsepower to help slow the vehicle down. This can provide the operator with increased control over the vehicle and substantially reduce wear on the service brakes of the vehicle.

Engine valve(s) may be actuated to produce compression-release braking and/or bleeder braking. The operation of a compression-release type engine brake, or retarder, is well known. As a piston travels upward during its compression stroke, the gases that are trapped in the cylinder are compressed. The compressed gases oppose the upward motion of the piston. During engine braking operation, as the piston approaches the top dead center (TDC), at least one exhaust valve is opened to release the compressed gases in the cylinder to the exhaust manifold, preventing the energy stored in the compressed gases from being returned to the engine on the subsequent expansion down-stroke. In doing so, the engine develops retarding power to help slow the vehicle down. An example of a prior art compression release engine brake is provided by the disclosure of Cummins, U.S. Pat. No. 3,220,392 (Nov. 1965), which is incorporated herein by reference.

The operation of a bleeder type engine brake has also long been known. During engine braking, in addition to the normal exhaust valve lift, the exhaust valve(s) may be held slightly open continuously throughout the remaining engine cycle (full-cycle bleeder brake) or during a portion of the cycle (partial-cycle bleeder brake). The primary difference between a partial-cycle bleeder brake and a full-cycle bleeder brake is that the former does not have exhaust valve lift during most of the intake stroke. An example of a system and method utilizing a bleeder type engine brake is provided by the disclosure of Assignee's U.S. Pat. No. 6,594,996 (Jul. 22, 2003), a copy of which is incorporated herein by reference.

The basic principles of exhaust gas recirculation (EGR) are also well known. After a properly operating engine has performed work on the combination of fuel and inlet air in its combustion chamber, the engine exhausts the remaining gas from the engine cylinder. An EGR system allows a portion of these exhaust gases to flow back into the engine cylinder. This recirculation of gases into the engine cylinder may be used during positive power operation, and/or during engine braking cycles to provide significant benefits. As used herein, EGR may include brake gas recirculation (BGR), which is the recirculation of gases during engine braking cycles.

During positive power operation, an EGR system is primarily used to improve engine emissions. During engine positive power, one or more intake valves may be opened to admit fuel and air from the atmosphere, which contains the oxygen required to burn the fuel in the cylinder. The air, however, also contains a large quantity of nitrogen. The high temperature found within the engine cylinder causes the nitrogen to react with any unused oxygen and form nitrogen oxides (NOx). Nitrogen oxides are one of the main pollutants emitted by diesel engines. The recirculated gases provided by an EGR system have already been used by the engine and contain only a small amount of oxygen. By mixing these gases with fresh air, the amount of oxygen entering the engine may be reduced and fewer nitrogen oxides may be formed. In addition, the recirculated gases may have the effect of lowering the combustion temperature in the engine cylinder below the point at which nitrogen combines with oxygen to form NOx. As a result, EGR systems may work to reduce the amount of NOx produced and to improve engine emissions. Current environmental standards for diesel engines, as well as proposed regulations, in the United States and other countries indicate that the need for improved emissions will only become more important in the future.

An EGR system may also be used to optimize retarding power during engine braking operation. As discussed above, during engine braking, one or more exhaust valves may be selectively opened to convert, at least temporarily, the engine into an air compressor. By controlling the pressure and temperature in the engine using EGR, the level of braking may be optimized at various operating conditions.

In many internal combustion engines, the engine intake and exhaust valves may be opened and closed by fixed profile cams, and more specifically by one or more fixed lobes which may be an integral part of each of the cams. Benefits such as increased performance, improved fuel economy, lower emissions, and better vehicle drivability may be obtained if the intake and exhaust valve timing and lift can be varied. The use of fixed profile cams, however, can make it difficult to adjust the timings and/or amounts of engine valve lift to optimize them for various engine operating conditions.

One method of adjusting valve timing and lift, given a fixed cam profile, has been to provide variable valve actuation and incorporate a "lost motion" device in the valve train linkage between the valve and the cam. Lost motion is the term applied to a class of technical solutions for modifying the valve motion proscribed by a cam profile with a variable length mechanical, hydraulic, or other linkage assembly. In a lost motion system, a cam lobe may provide the "maximum" (longest dwell and greatest lift) motion needed over a full range of engine operating conditions. A variable length system may then be included in the valve train linkage, intermediate of the valve to be opened and the cam providing the maximum motion, to subtract or lose part or all of the motion imparted by the cam to the valve.

Proper control of the engine valve lift and actuation timing when utilizing a lost motion system may improve engine performance and reliability during engine braking, positive power, and/or EGR/BGR operation. For example, during engine braking, the main exhaust event may experience an added valve lift because lash in the system may be taken up. This added valve lift may create an increased overlap between the main exhaust event and the main intake event, and cause excess exhaust gases to flow back into the cylinder and into the intake manifold. This result may lead to braking and EGR performance issues, such as higher injector tip temperature and lower engine retarding power. In addition, the added valve lift may cause reliability issues, including increased potential of valve-to-piston contact. Accordingly, by reducing the added valve lift during engine braking, braking performance and engine reliability may be improved.

Proper control of the engine valve lift and timing may also lead to improvements during positive power operation. For example, main intake event timing may be modified such that the intake valve closes earlier than a standard main intake valve event. This process is known as a Miller Cycle. Controlling the main intake event valve timing may lead to improved fuel economy and emissions.

Cost, packaging, and size are factors that may often determine the desirableness of an engine brake. Additional systems that may be added to existing engines are often cost-prohibitive and may have additional space requirements due to their bulky size. Pre-existing engine brake systems may avoid high cost or additional packaging, but the size of these systems and the number of additional components may often result in lower reliability and difficulties with size. It is thus often desirable to provide an integral engine braking system that may be low cost, provide high performance and reliability, and yet not provide space or packaging challenges.

Embodiments of the systems and methods of the present invention may be particularly useful in engines requiring valve actuation for positive power, engine braking valve events and/or EGR/BGR valve events. Some, but not necessarily all, embodiments of the present invention may provide a system and method for selectively actuating engine valves utilizing a lost motion system. Some, but not necessarily all, embodiments of the present invention may provide improved engine performance and efficiency during positive power, engine braking, and/or EGR/BGR operation. Additional advantages of embodiments of the invention are set forth, in part, in the description which follows and, in part, will be apparent to one of ordinary skill in the art from the description and/or from the practice of the invention.

SUMMARY OF THE INVENTION

Applicant has developed an innovative system for actuating one or more engine valves to produce an engine valve event. In one embodiment, the system comprises a valve bridge for the one or more engine valves, wherein a lost motion component is included in the valve bridge.

Applicant has further developed an innovative valve actuation system having a rocker arm and an engine valve. In one embodiment, the system comprises means for varying actuation of the engine valve during engine operation, wherein the means for varying is provided at least in part in a valve train element disposed between the rocker arm and the engine valve.

Applicant has developed an innovative system for actuating one or more engine valves in an internal combustion engine to produce an engine valve event. In one embodiment, the system comprises: motion imparting means; a rocker arm pivotally mounted on a shaft and adapted to rotate between a first position and a second position, the rocker arm selectively receiving motion from the motion imparting means; a valve bridge disposed between the rocker arm and the one or more engine valves; and a lost motion system disposed in the valve bridge.

Applicant has further developed an innovative system for actuating one or more engine valves in an internal combustion engine to produce an engine valve event. In one embodiment, the system comprises: motion imparting means; a rocker arm pivotally mounted on a shaft and adapted to rotate between a first position and a second position, the rocker arm selectively receiving motion from the motion imparting means; a valve bridge disposed between the rocker arm and the one or more engine valves; and a first piston slidably disposed in the valve bridge, wherein the first piston selectively causes the rocker arm to rotate from the first position to the second position.

Applicant has further developed an innovative method of selectively actuating an engine valve to produce an engine valve event. In one embodiment, the method comprises the steps of: providing motion imparting means in selective contact with a rocker arm pivotally mounted on a rocker shaft; selectively supplying hydraulic fluid to a valve bridge; and controlling the amount of motion imparted to the rocker arm responsive to the supply of the hydraulic fluid to the valve bridge.

Applicant has developed an innovative system for actuating one or more engine valves to produce an engine valve event. In one embodiment, the system comprises: a rocker arm pivotally mounted on a shaft and adapted to rotate between a first position and a second position, the rocker arm selectively receiving motion from a valve train element; a valve bridge for the one or more engine valves; and means for varying actuation of the engine valve, wherein the means for varying is provided at least in part in the valve bridge.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

BRIEF DESCRIPTION OF THE DRAWINGS

In order to assist the understanding of this invention, reference will now be made to the appended drawings, in which like reference characters refer to like elements. The drawings are exemplary only, and should not be construed as limiting the invention.

DETAILED DESCRIPTION OF PREFERRED EMBODIMENTS OF THE PRESENT INVENTION

Reference will now be made in detail to embodiments of the systems and methods of the present invention, examples of which are illustrated in the accompanying drawings. As embodied herein, embodiments of the present invention include systems and methods of actuating one or more engine valves.

Figure 1:
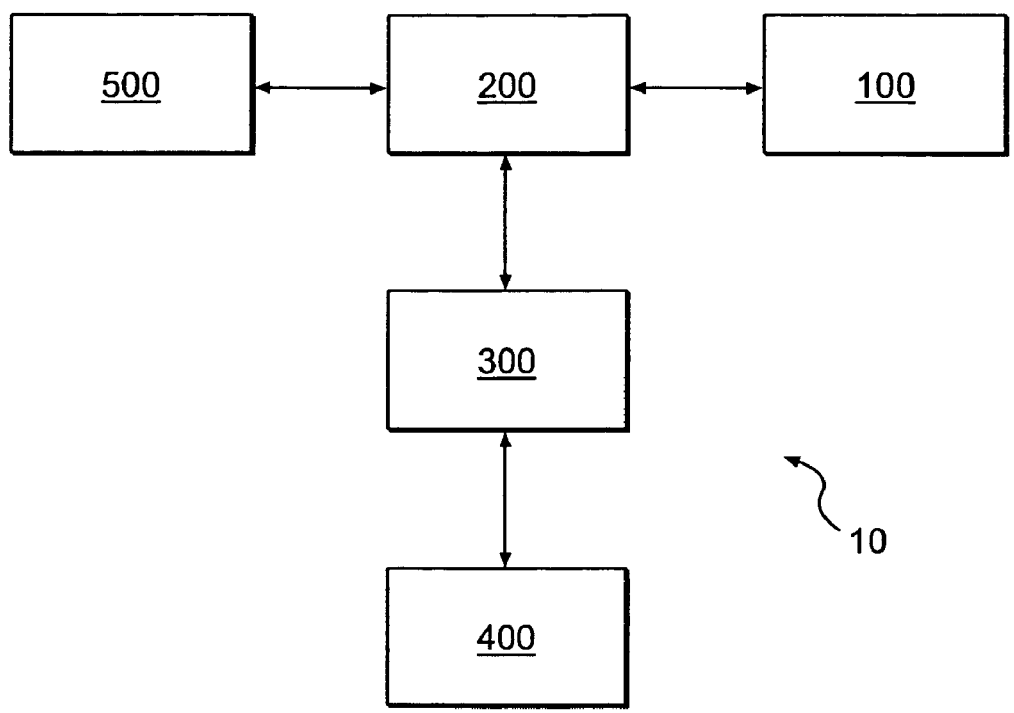
FIG. 1 is a block diagram of an engine valve actuation system in accordance with a first embodiment of the present invention.

A first embodiment of the present invention is shown schematically in FIG. 1 as valve actuation system 10. The valve actuation system 10 includes means for imparting motion 100 operatively connected to a rocker arm 200. The rocker arm 200 is operatively connected to a lost motion system 300, which in turn, is operatively connected to one or more engine valves 400. The motion imparting means 100 is adapted to selectively apply motion to the rocker arm 200. The lost motion system 300 may be selectively controlled such that all or a portion of the motion from the motion imparting means 100 is (1) transferred or (2) not transferred through the rocker arm 200 to the engine valves 400. The lost motion system 300 may also be adapted to modify the amount and timing of the motion transferred to the engine valves 400. The engine valves 400 may comprise one or more exhaust valves, intake valves, or auxiliary valves.

When operating in the motion transfer mode, the lost motion system 300 may actuate the engine valves 400 to produce an engine valve event, including, but not limited to, a compression release braking event, a partial-cycle bleeder braking event, a full-cycle bleeder braking event, an exhaust gas recirculation event, a main exhaust event, and/or a main intake event. The valve actuation system 10 may be switched between the modes of transferring motion and not transferring motion in response to a signal or input from a controller 500.

Figure 2:
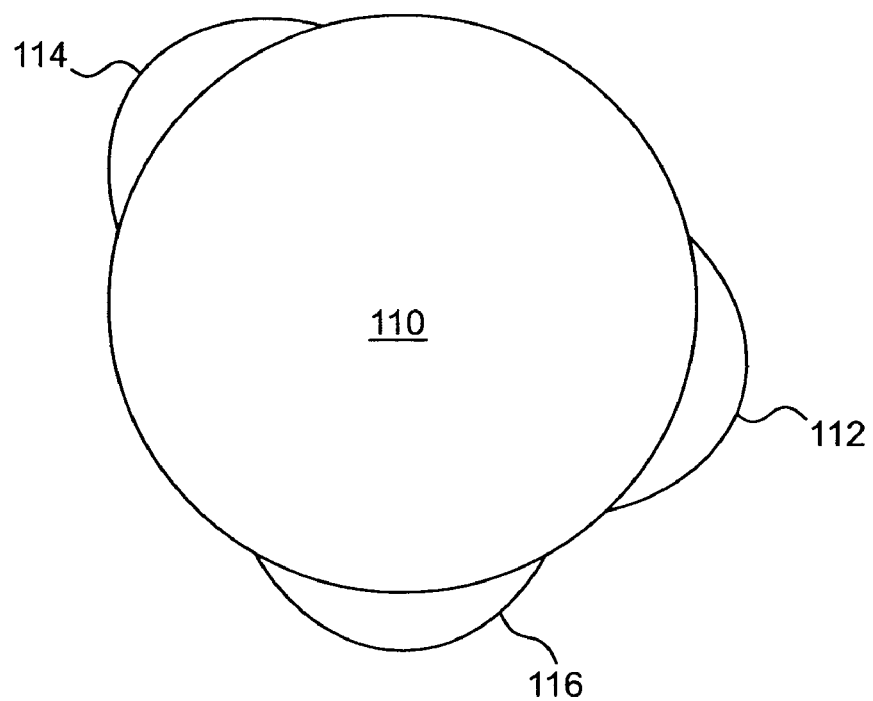
FIG. 2 is a schematic diagram of a cam that may be used in accordance with an embodiment of the present invention.

The motion imparting means 100 may comprise any combination of valve train elements, including, but not limited to, cam(s), push tube(s), or their equivalents, adapted to impart motion to the rocker arm 200. In at least one embodiment of the present invention, the motion imparting means 100 may comprise a cam 110. The cam 110 may comprise an exhaust cam, an intake cam, an injector cam, and/or a dedicated cam. The cam 110 may include one or more cam lobes for producing an engine valve event(s). With reference to FIG. 2, the cam 110 may include lobes, such as, for example, a main (exhaust or intake) event lobe 112, an engine braking lobe 114, and an EGR/BGR lobe 116. The depictions of the lobes on the cam 110 are intended to be illustrative only, and not limiting. It is appreciated that the number, combination, size, location, and shape of the lobes may vary markedly without departing from the intended scope of the present invention.

The controller 500 may comprise any electronic or mechanical device for communicating with the valve actuation system 10 and causing all or a portion of the motion from the motion imparting means 100 to be transferred, or not transferred, through the rocker arm 200 to the engine valves 400. For example, in one embodiment of the present invention, the controller 500 may control a supply valve to selectively supply hydraulic fluid to the rocker arm 200. The controller 500 may include a microprocessor, linked to other engine component(s), to determine and select the appropriate operation. Engine valve events may be optimized at a plurality of engine operating conditions (e.g., speeds, loads, etc.) based upon information collected by the microprocessor from the engine component(s). The information collected may include, without limitation, engine speed, vehicle speed, oil temperature, manifold (or port) temperature, manifold (or port) pressure, cylinder temperature, cylinder pressure, particulate information, and/or crank angle.

Figure 3:
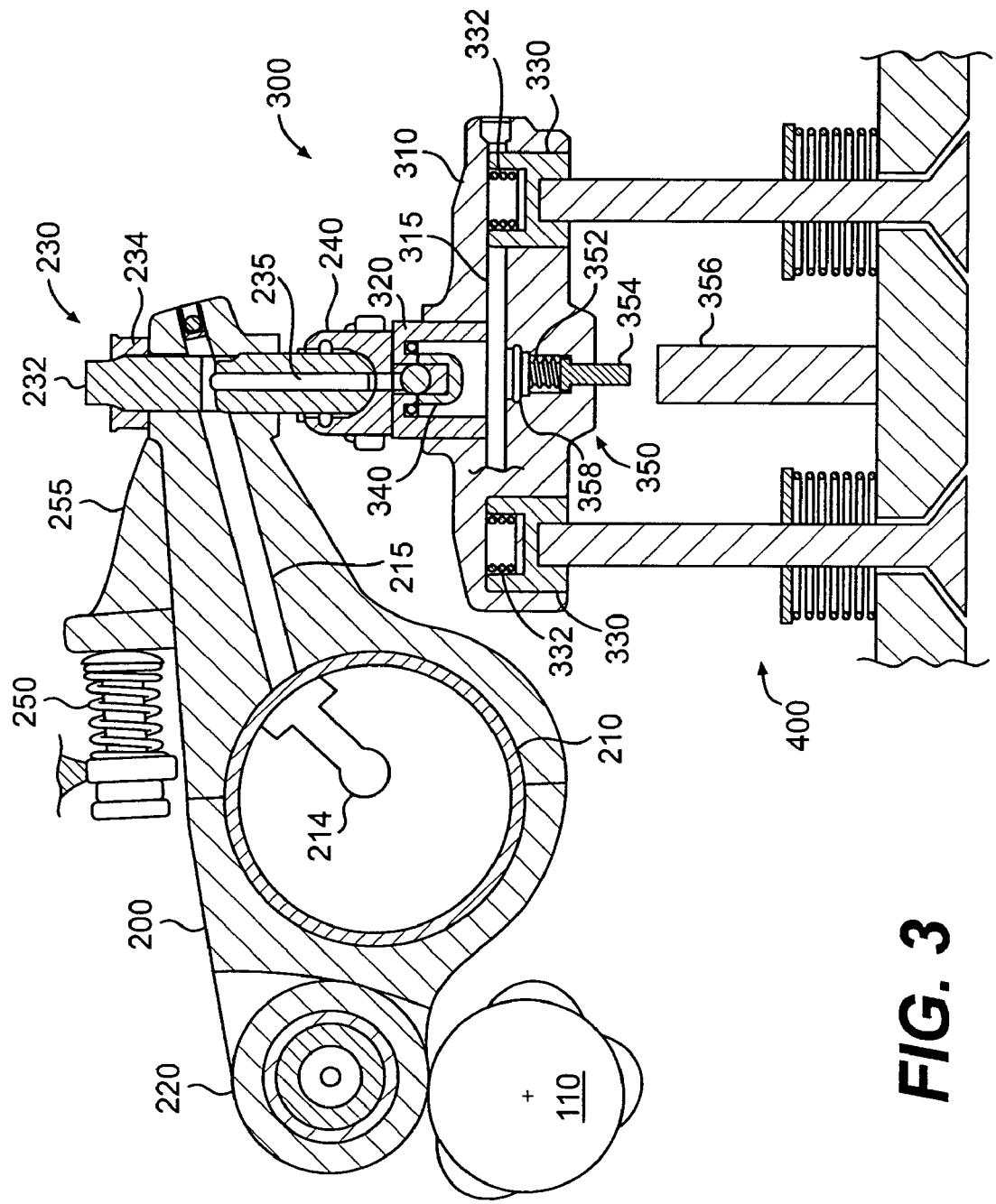
FIG. 3 is a partial cross sectional view of an engine valve actuation system in accordance with a second embodiment of the present invention.

A second embodiment of the present invention is shown in FIG. 3. The rocker arm 200 may be pivotally mounted on a rocker shaft 210 such that the rocker arm 200 is adapted to rotate about the rocker shaft 210. A motion follower 220 may be disposed at one end of the rocker arm 200 and may act as the contact point between the rocker arm 200 and the cam 110 to facilitate low friction interaction between the elements. In one embodiment of the present invention, the motion follower 220 may comprise a roller follower 220, as shown in FIG. 3. Other embodiments of a motion follower adapted to contact the cam 110 are considered to be well within the scope and spirit of the present invention.

Hydraulic fluid may be supplied to the rocker arm 200 from a hydraulic fluid supply (not shown). The hydraulic fluid may flow through a passage 214 formed in the rocker shaft 210 to a hydraulic passage 215 formed within the rocker arm 200. The arrangement of hydraulic passages in the rocker shaft 210 and the rocker arm 200 shown in FIG. 3 are for illustrative purposes only. Other hydraulic arrangements for supplying hydraulic fluid through the rocker arm 200 to the lost motion system 300 are considered well within the scope and spirit of the present invention.

An adjusting screw assembly 230 may be disposed at a second end of the rocker arm 200. The adjusting screw assembly 230 may comprise a screw 232 extending through the rocker arm 200, and a threaded nut 234 which may provide for adjustment of the screw 232. A hydraulic passage 235 in communication with the rocker passage 215 may be formed in the screw 232. A swivel foot 240 may be disposed at one end of the screw 232. In one embodiment of the present invention, low pressure oil may be supplied to the rocker arm 200 to lubricate the swivel foot 240.

The lost motion system 300 may be provided at least in part in a valve train element disposed between the rocker arm 200 and the engine valves 400. In one embodiment, as shown in FIG. 3, the lost motion system 300 may be disposed in a valve bridge 310. The lost motion system 300 may include any combination of one or more lost motion components such that all or a portion of the motion from the motion imparting means 100 is (1) transferred or (2) not transferred through the rocker arm 200 to the engine valves 400. The lost motion system 300 may comprise, for example, a mechanical linkage, a hydraulic circuit, a hydro-mechanical linkage, an electromechanical linkage, and/or any other linkage adapted to transfer or not transfer the motion. The lost motion system 300 may include means for adjusting the pressure, or amount of fluid in a hydraulic circuit, such as, for example, trigger valve(s), check valve(s), accumulator(s), and/or other devices used to release hydraulic fluid from or add hydraulic fluid to a circuit in the lost motion system 300.

In one embodiment of the present invention, the lost motion system 300 may include a master piston 320 slidably disposed in a bore formed in the valve bridge 310, and one or more slave pistons 330, each slidably disposed in a bore formed in the valve bridge 310. A piston spring 332 may bias each of the slave pistons 330 in a direction toward the engine valves 400. The master piston 320 may be in fluid communication with the slave pistons 330 through a hydraulic passage 315 formed in the valve bridge 310.

A check valve assembly 340 may be disposed in a cavity formed in the master piston 320 so as to primarily allow only one-way fluid communication from the rocker arm 200 to the valve bridge 310. The swivel foot 240 may contact the master piston 320 and is adapted to swivel as the rocker arm 200 rotates so as to substantially maintain contact with the master piston 320.

Hydraulic fluid may be supplied to the lost motion system 300 through the rocker arm 200. The hydraulic fluid may flow through the screw passage 235, past the check valve 340 and into the valve bridge passage 315. One embodiment of the present invention may operate using a dual supply pressure system. Low pressure fluid may be supplied constantly to the rocker arm 200 for lubrication purposes. The bias of the check valve assembly 340 may be sufficient to prevent the low pressure fluid from entering the passage 315. When activation of the lost motion system 300 is required, for example, during engine braking, the supply pressure may be increased such that the check valve 340 is forced open. The supply pressure may be increased, for example, by a solenoid supply valve. In an alternative embodiment, hydraulic fluid may be supplied directly to the lost motion system 300 independent of the rocker arm 200.

The position of the rocker arm 200 may be biased by a rocker spring 250. In one embodiment of the present invention, as shown in FIG. 3, the rocker spring 250 is disposed proximate to a projection 255 formed on the rocker arm 200, and may be secured to a fixed member, such as, for example, the rocker shaft 210. When the master piston 320 is retracted, the rocker spring 250 biases the rocker arm 200 into a first position in which a lash is formed between the cam 110 and the roller follower 220. In this position, the lash may prevent all or a portion of the motion provided by the motion imparting means 100 from being imparted to the rocker arm 200, and ultimately, to the engine valves 400. When the master piston 320 is extended, as shown in FIG. 3, the rocker arm 200 rotates such that the rocker arm projection 255 acts against the bias of the rocker spring 250. In this position, the lash between the cam 110 and the rocker arm 200 is taken up and the rocker arm 200 contacts the cam 110 at base circle. In an alternative embodiment, the rocker spring 250 may be disposed at the end of the rocker arm 200 proximate the screw assembly 230. Other positions for the rocker spring 250 are considered to be within the scope and spirit of the present invention.

In an alternative embodiment, the rocker spring 250 may bias the rocker arm 200 toward the cam 110. In this embodiment, the swivel foot 240 may be provided such that it maintains contact with the master piston 320.

The lost motion system 300 may further comprise means 350 for resetting the position of the engine valve(s) 400. The resetting means 350 is adapted to seal hydraulic fluid in the valve bridge 310 and selectively release the hydraulic fluid. The resetting means 350 may include a sealing member 354 disposed in a bore formed in the valve bridge 310, and a spring 352 that biases the sealing member 354 against its seat in the valve bridge 310. The spring 352 may be secured to a base 358 fixedly disposed in the valve bridge 310. In this position, the sealing member 354 seals hydraulic fluid within the valve bridge 310. As the valve bridge 310 moves subject to the motion of the rocker arm 200, the sealing member 354 selectively contacts a reset plunger 356 disposed between the engine valves 400. When the sealing member 354 contacts the reset plunger 356, the sealing member 354 is unseated and hydraulic fluid in the valve bridge 310 is released.

Figure 6:
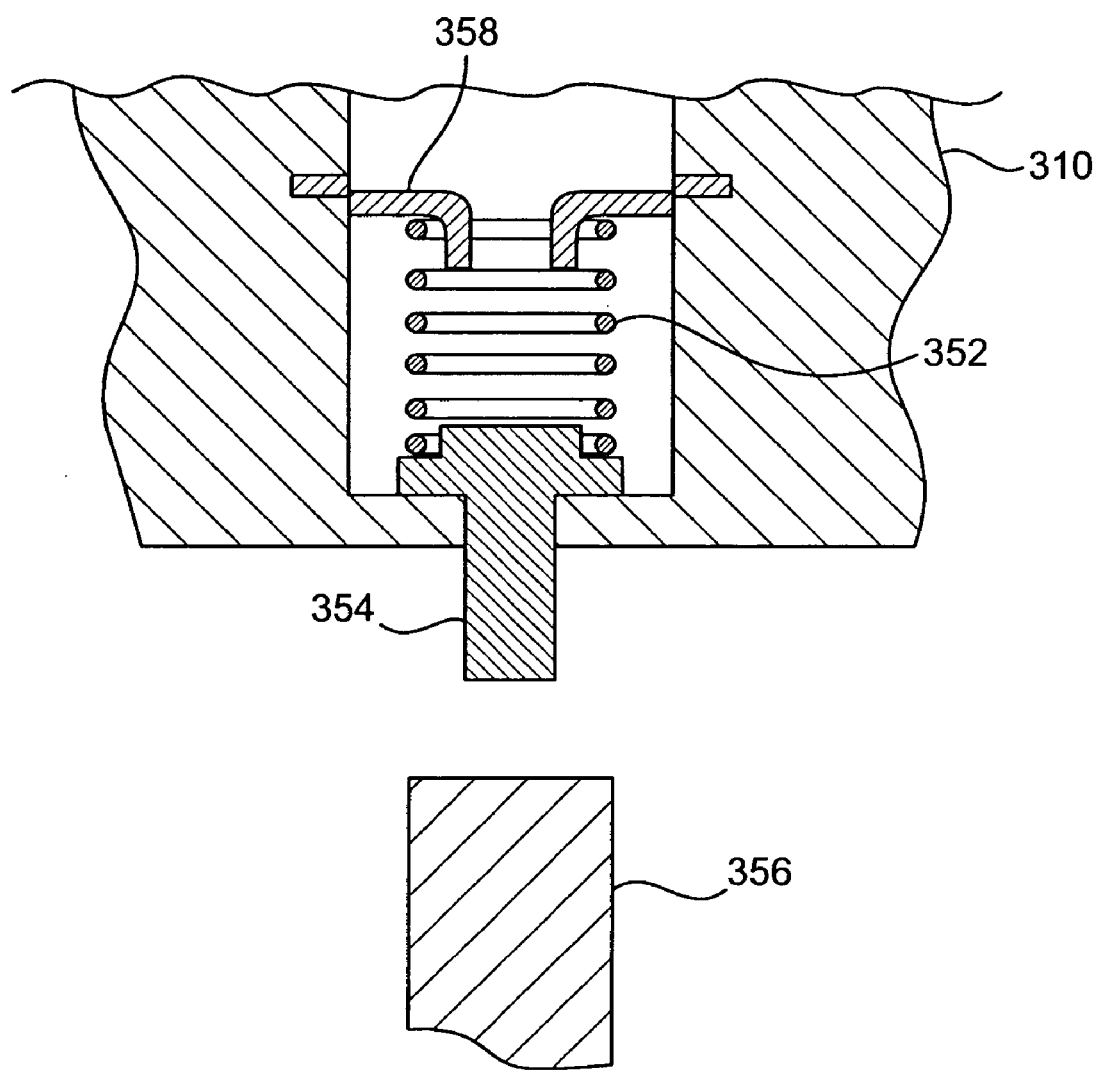
FIG. 6 is a cross sectional view of a sliding pin reset mechanism in accordance with an embodiment of the present invention.
Figure 7:
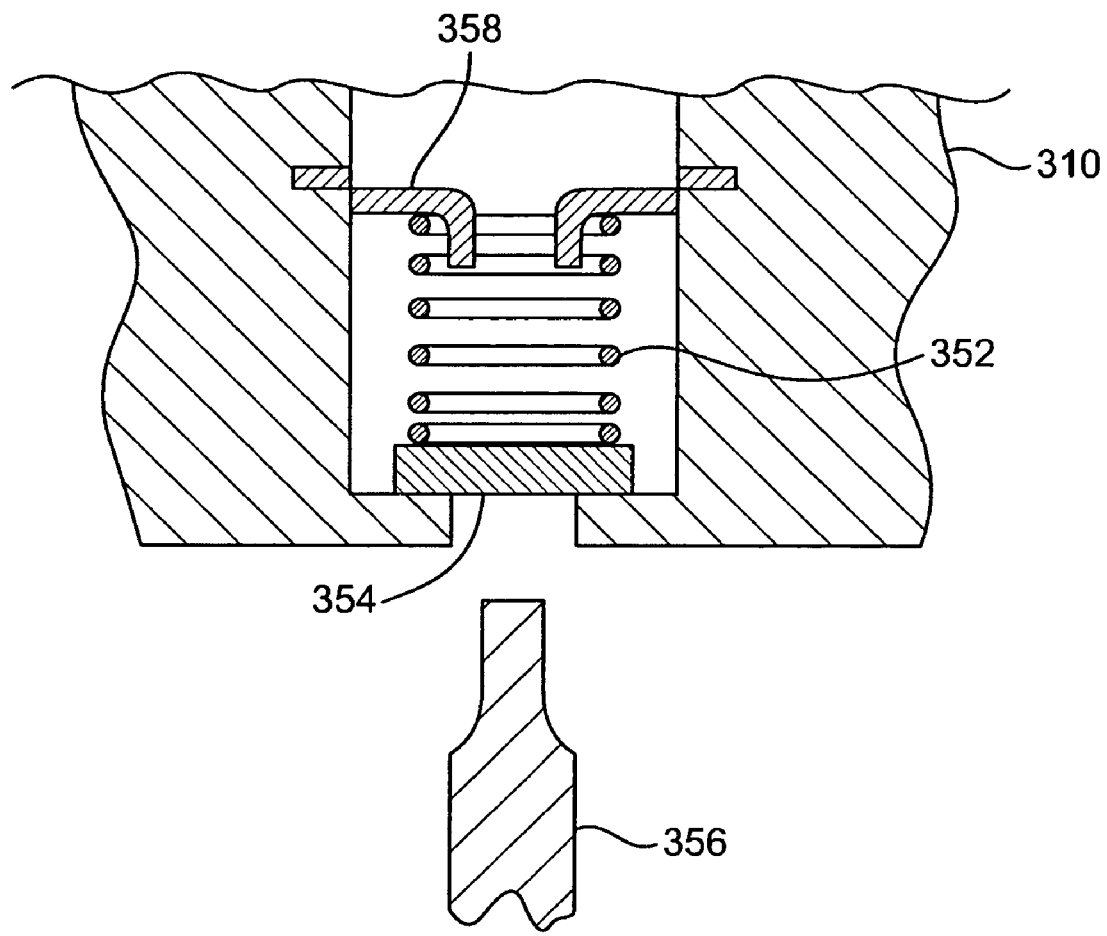
FIG. 7 is a cross sectional view of a check disk reset mechanism in accordance with an embodiment of the present invention.
Figure 8:
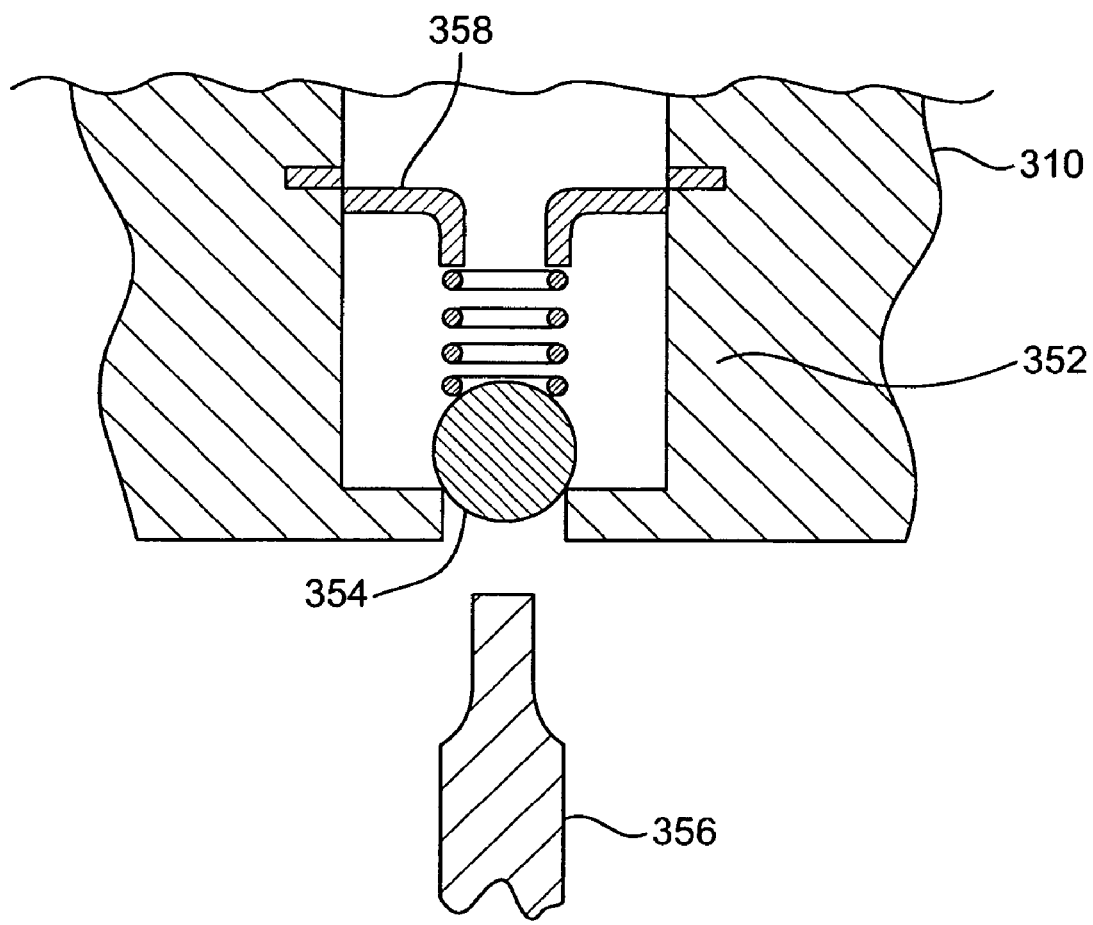
FIG. 8 is a cross sectional view of a check ball reset mechanism in accordance with an embodiment of the present invention.

In one embodiment of the present invention, as shown in FIG. 6, the sealing member 354 may comprise a sliding pin 354 slidably disposed in a bore formed in the valve bridge 310. A portion of the sliding pin 354 may extend from the valve bridge 310 such that when the pin 354 contacts the reset plunger 356, the pin is unseated and the high pressure hydraulic fluid in the valve bridge is released. In an alternative embodiment, as shown in FIG. 7, the sealing member 354 may comprise a check disk 354. In yet another embodiment, as shown in FIG. 8, the sealing member may comprise a check ball 354. In the embodiments shown in FIGS. 7 and 8, the reset plunger may include a narrow head portion adapted to extend within the valve bridge 310 and unseat the check disk or ball. Other resetting means, such as, for example, a poppet valve, a spool valve, and/or a reed valve, suitable for sealing in and selectively releasing high pressure fluid from the valve bridge 310 are considered to be well within the scope and spirit of the present invention.

In one embodiment of the present invention, the reset plunger 356 maintains a fixed position relative to the sealing member 354. Alternatively, the reset plunger 356 may be controlled to actuate between a plurality of positions relative to the sealing member 354 such that particular valve lift and timing requirements may be achieved. For example, hydraulic fluid may be selectively supplied to the reset plunger 356 such that it may extend to a position closer to the sealing member 354. In this manner, the resetting means 350 may have on/off capability and/or low-speed variability.

Figure 9:
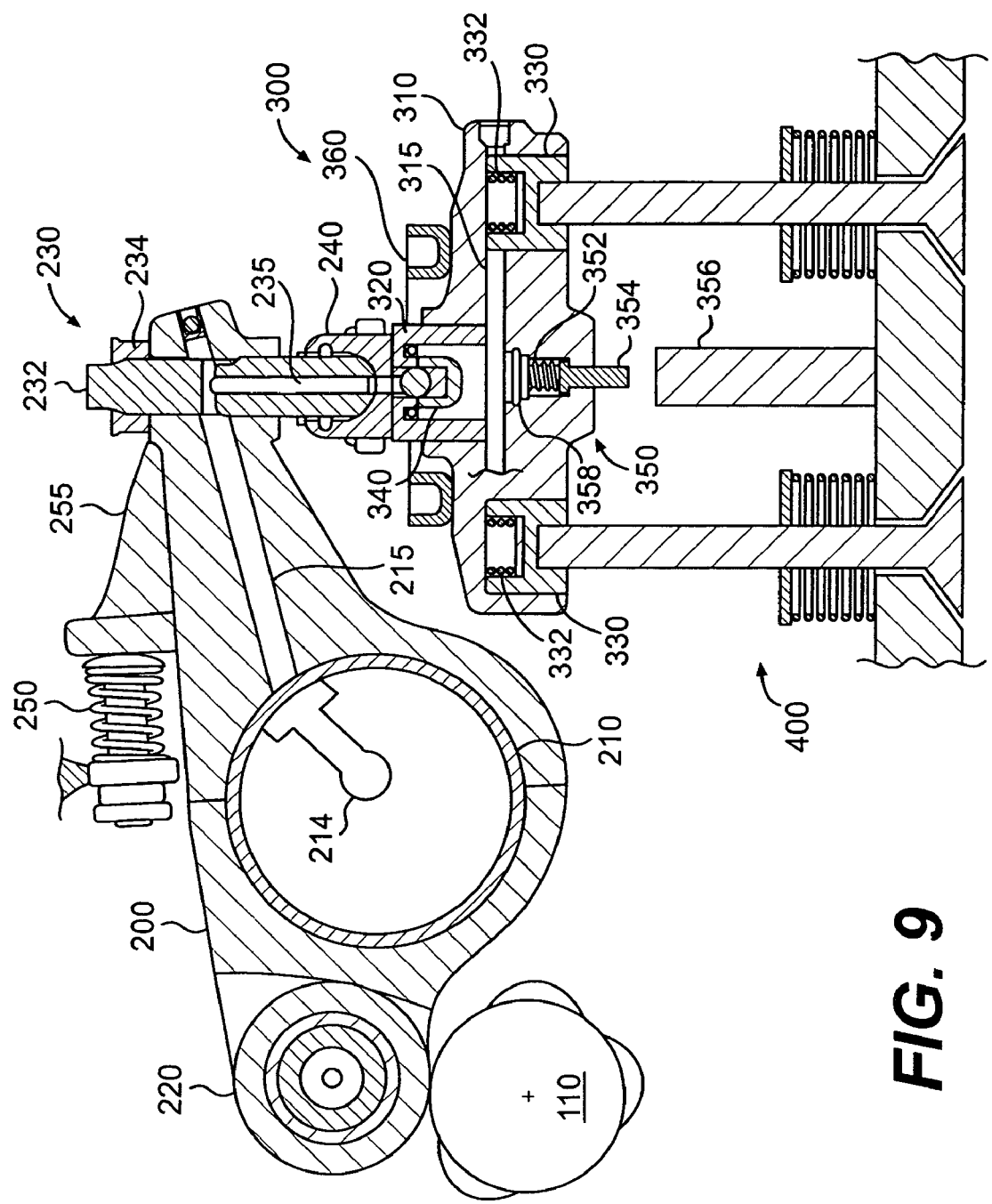
FIG. 9 is cross sectional view of an engine valve actuation system in accordance with a fifth embodiment of the present invention.

With reference to FIG. 9, the valve actuation system 10 may further comprise a stationary member 360 disposed between the valve bridge 310 and the rocker arm 200. In one embodiment, the stationary member 360 may comprise a collar. The stationary member 360 may be secured to a fixed member, such as, for example, the engine overhead. The stationary member 360 is adapted to limit the upward travel of the valve bridge 310, and, in turn, the force applied by the rocker arm 200 on the motion imparting means 100. The position of the stationary member 360 relative to the valve bridge 310 may be adjusted such that there is an appropriate lash between the stationary member 360 and the valve bridge 310.

Operation of an embodiment of the present invention will now be described with reference to FIG. 9. When transfer of the motion from the cam 110 to the engine valves 400 is desired, for example, during engine braking, hydraulic fluid is supplied to the rocker arm 200 through the rocker shaft passage 214. The hydraulic fluid flows through the rocker passage 215 and the screw passage 235 to the lost motion system 300. The fluid pressure may be sufficient to overcome the bias of the check valve 340, and flow into the valve bridge passage 315. Because the check valve 340 provides substantially one-way fluid communication, the hydraulic fluid cannot escape through the check valve back into the screw passage 235. As a result, a hydraulic lock is created between the master piston 320 and the slave pistons 330. The hydraulic pressure causes the master piston 320 to extend and apply an upward force against the swivel foot 240, and, in turn, the proximal end of the rocker arm 200. This force is sufficient to overcome the bias of the rocker spring 250 and cause the rocker arm 200 to rotate in a counter-clockwise direction (relative to the view shown in FIG. 9), taking up the lash between the rocker follower 220 and the cam 110. The rocker arm 200 may rotate until the roller follower 220 contacts the cam 110 at base circle.

In the embodiment of the present invention wherein the lost motion system 300 comprises a master piston 320 and one or more slave pistons 330, and the slave pistons have a larger cross-sectional area than the master piston 320, the hydraulic pressure in the valve bridge passage may create a net upward force on the valve bridge 310. The collar 360, however, prevents upward translation of the valve bridge 310. As a result, the load transferred to the rocker arm 200 and the cam 110 during engine braking operation may be reduced.

Because the roller follower 220 is now in contact with the cam 110, as the cam 110 rotates, the motion of the engine braking lobe 114 is imparted to the rocker arm 200. This causes the rocker arm 200 to rotate about the shaft 210 and provide a downward force on the master piston 320. Subject to the rocker arm motion, the master piston 320 translates downward within its bore in the valve bridge 310. Because of the hydraulic lock in the valve bridge 310, the downward motion of the master piston 320 is transferred through the hydraulic pressure in the passage 315 to the slave pistons 330, which, in turn, move downward and actuate the engine valves 400 to produce the engine braking valve event.

As the cam 110 continues to rotate, the roller follower 220 approaches the main event lobe 112. The rocker arm 200 begins to rotate and impart the motion of the lobe on the master piston 320. Because of the hydraulic lock in the valve bridge 310, the downward motion of the master piston 320 is transferred through the hydraulic pressure in the passage 315 to the slave pistons 330, which, in turn, move downward and actuate the engine valves 400 to produce the main valve event. As the rocker arm 200 acts on the master piston 320, the valve bridge 310 also translates downward. As the roller follower 220 begins to reach the peak of the main event lobe 112, the downward motion of the valve bridge 310 brings the sealing member 354 into contact with the reset plunger 356. The reset plunger 356 forces the sealing member 354 off its seat, allowing hydraulic fluid in the valve bridge 310 to be released. The release of the hydraulic fluid from the valve bridge 310 causes the master piston 320 and/or the slave pistons 330 to retract from their extended positions, and the additional valve lift created by the hydraulic fluid column in the valve bridge 310 is lost. As the roller follower 220 follows the remainder of the main event lobe 112, motion is transferred through a solid mechanical linkage to the engine valves 400.

Figure 10:
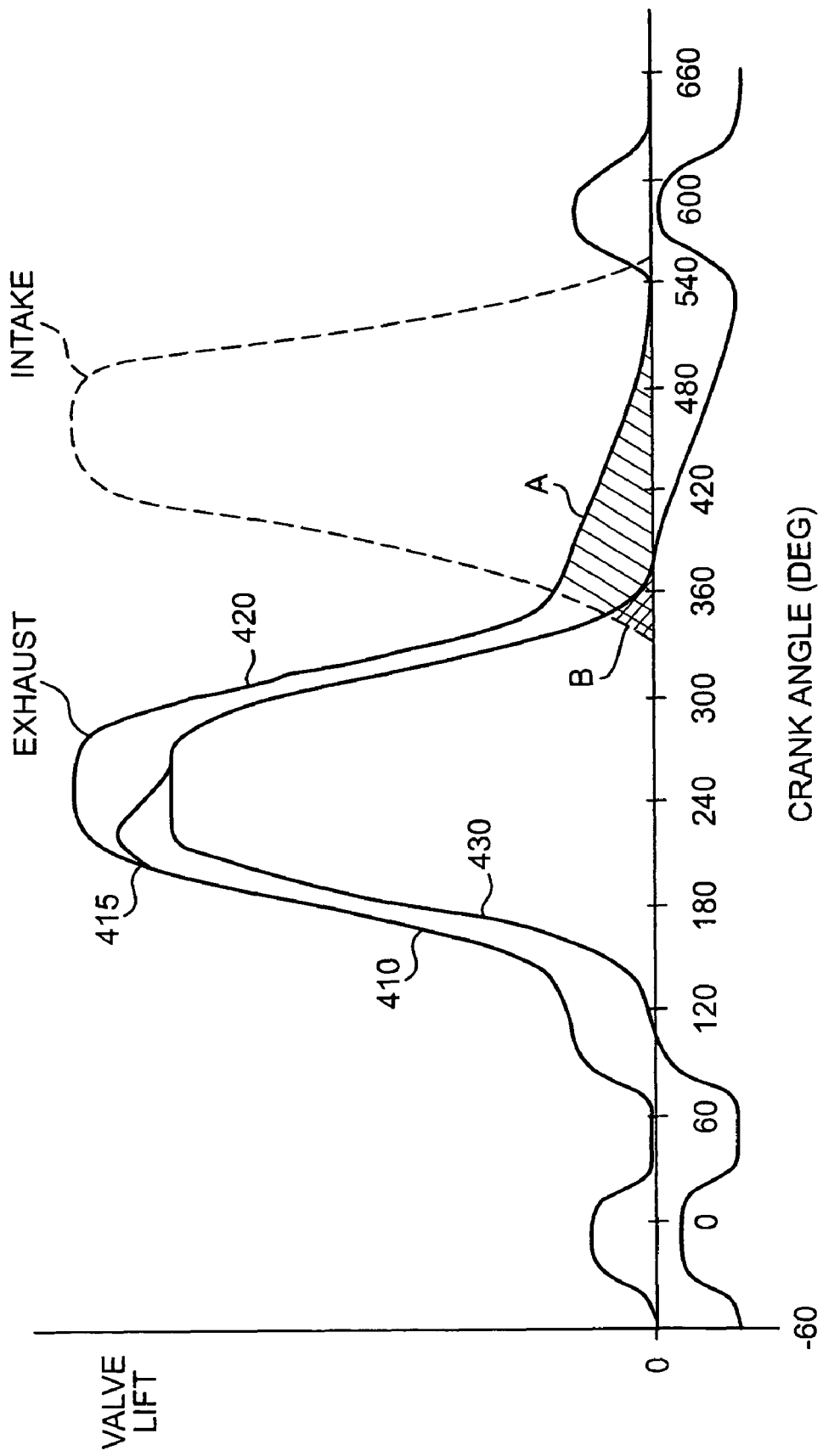
FIG. 10 is a valve lift diagram of exhaust valve and intake valve events, including a modified main exhaust event, according to an embodiment of the present invention.

FIG. 10 is a valve lift diagram of exhaust valve and intake valve events, according to one embodiment of the present invention. During engine braking, the engine valves 400 may experience the valve lift profile 410. The point 415 illustrates the point during valve lift at which the hydraulic fluid is released from the valve bridge 310. At this point, the added valve lift created by the hydraulic fluid column is lost, and the valves experience a standard main event valve lift. The precise point 415 on the valve lift profile 410 at which the engine valve lift is reset may vary based on numerous factors, including, but not limited to, the relative positioning of the reset plunger 356 and the sealing member 354. Without the release of hydraulic fluid from the valve bridge 310, the engine valves 400 may experience a main event valve lift with added lift as illustrated by the valve lift profile 420 shown in FIG. 10. The valve lift profiles shown in FIG. 10 are for illustrative purposes only, and are not intended to be limiting.

During positive power operation, when engine braking is not required, hydraulic fluid of sufficient pressure to unseat the check valve assembly 340 and enter the passage 315 in the valve bridge 310 is not supplied to the rocker arm 200. The master piston 320 and/or the slave pistons 330 are retracted within the valve bridge 310. Any lubrication fluid present in the valve bridge 310 is of relatively low pressure. Accordingly, the force acting on the proximal end of the rocker arm 200 is insufficient to overcome the bias of the rocker spring 250, which biases the rocker arm 200 in a clockwise direction (relative to the view shown in FIG. 9) against the valve bridge 310. In this position, a lash is created between the cam 110 and the roller follower 220. As the cam 110 rotates, the distance between the cam 110 and the roller follower 220 is great enough that the engine braking lobe 114 (and the EGR/BGR lobe 116) will not contact the roller 220. As a result, no engine braking motion is imparted to the rocker arm 200 and the engine valves 400 do not experience the engine braking event. As the cam 110 continues to rotate, the roller follower 220 begins to contact the main valve event lobe 112. The roller makes contact at a point higher on the lobe than during engine braking because of the lash between the cam 110 and the roller follower 220. As a result, the engine valves 400 may experience a main event valve lift profile 430 without added lift, as shown in FIG. 10.

In one embodiment of the present invention, the overlap between the main exhaust event and the main intake event during engine braking may be reduced. As shown in FIG. 10, an overlap area A may occur when the engine valves 400 experience a valve lift profile 420 with added lift. However, when the motion of the engine valves 400 is reset such that the valves follow a standard main event, as illustrated by the valve lift profile 410, the overlap area may be reduced. The reduced overlap area is illustrated by the area B in FIG. 10.

Figure 11:
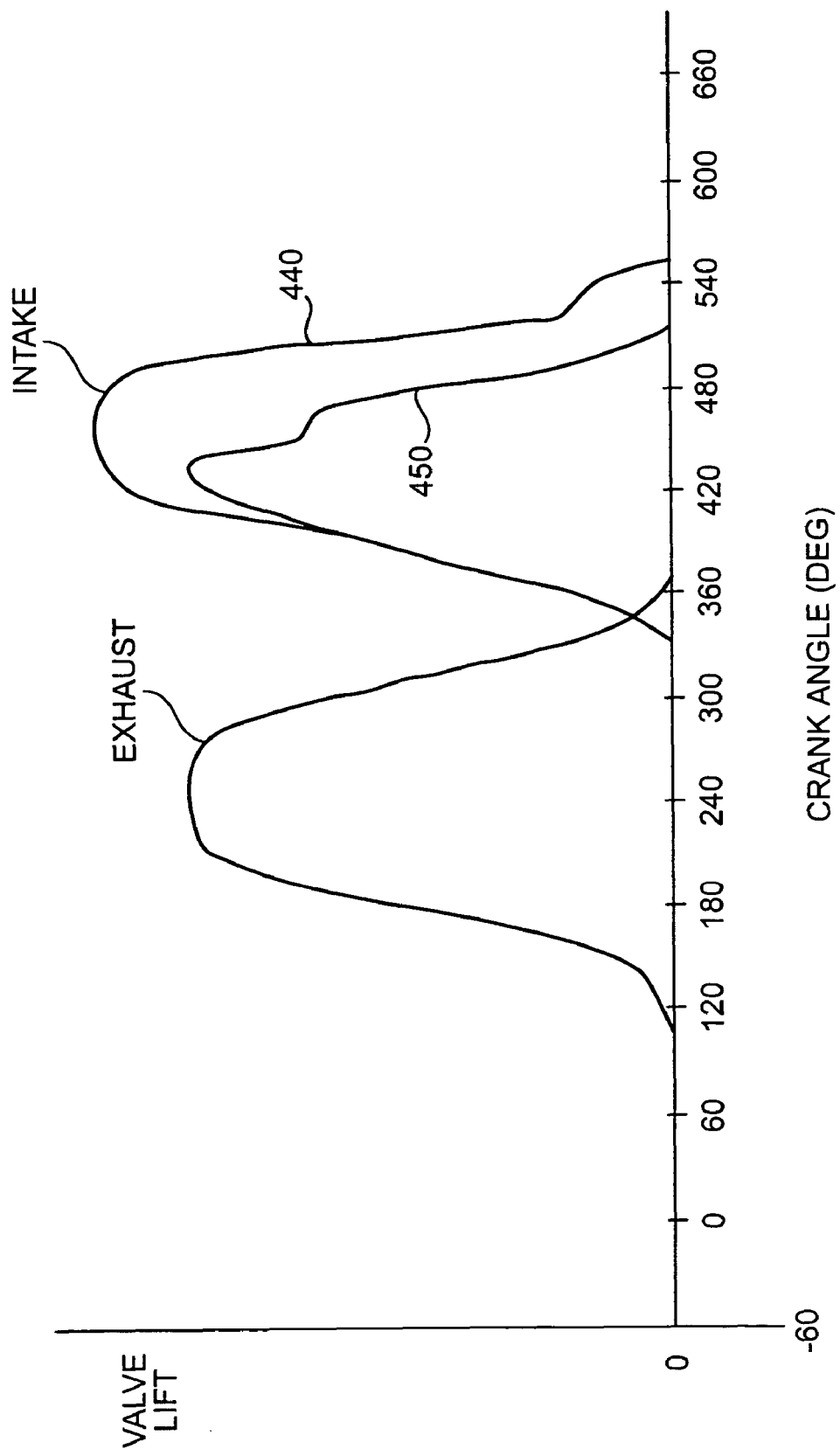
FIG. 11 is a valve lift diagram of exhaust valve and intake valve events, including a modified main intake event, according to an embodiment of the present invention.

In one embodiment of the present invention, the main valve event may experience an earlier closing time. As shown in FIG. 11, an engine intake valve may experience the valve lift profile 440 during a main intake valve event. However, the motion of the engine valve may be modified such that the valve closes earlier, as illustrated by the valve lift profile 450. The valve lift profiles shown in FIG. 11 are for illustrative purposes only, and are not intended to be limiting.

Figure 4:
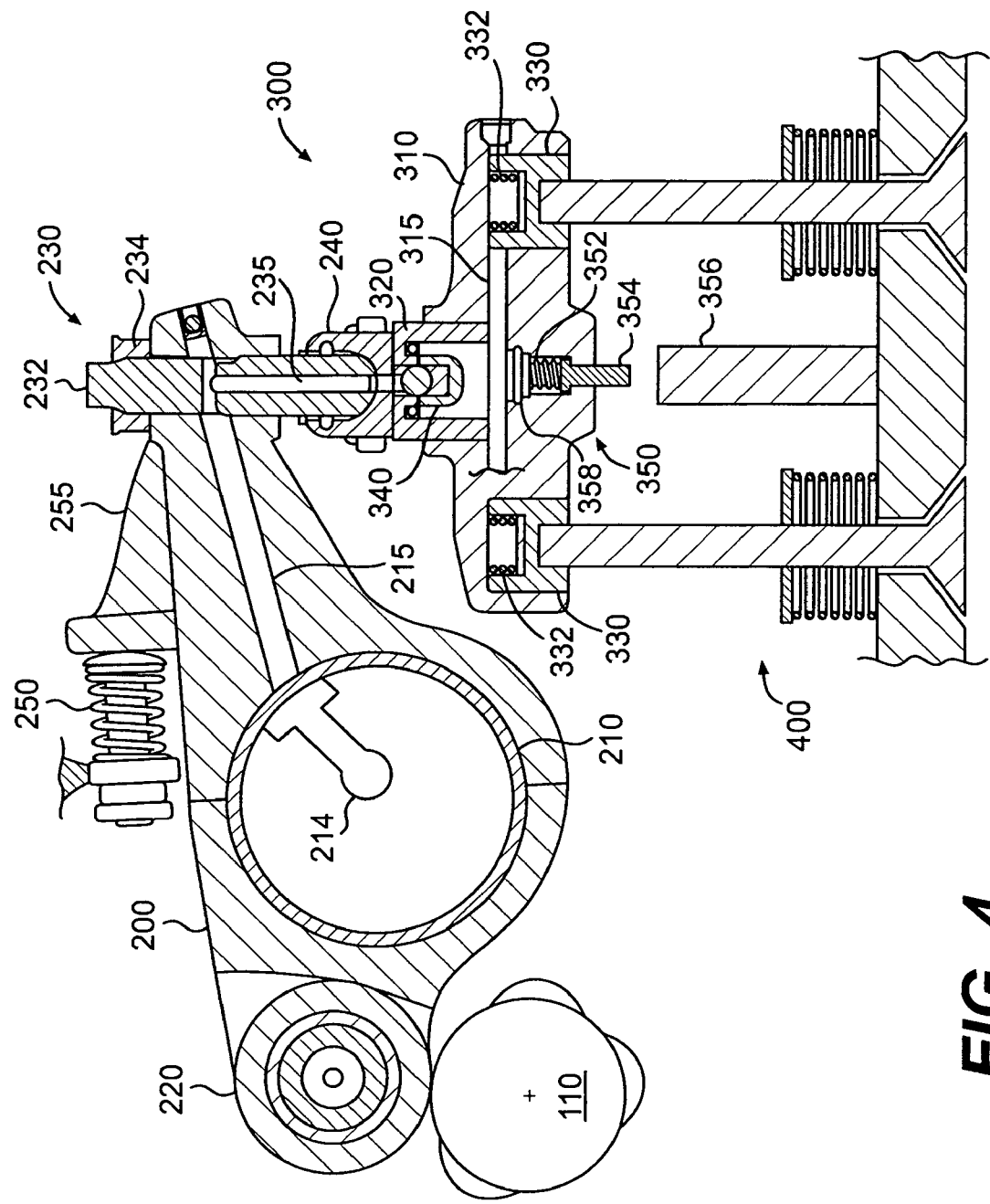
FIG. 4 is a partial cross sectional of an engine valve actuation system in accordance with a third embodiment of the present invention.

Another embodiment of the present invention is shown with reference to FIG. 4, in which like reference characters refer to like elements. The lost motion system 300 may include first and second pistons 330 slidably disposed in the valve bridge 310.

Operation of the embodiment shown in FIG. 4 will now be described. When transfer of the motion from the cam 110 to the engine valves 400 is desired, for example, during engine braking, hydraulic fluid is supplied to the rocker arm 200 through the rocker shaft passage 214. The hydraulic fluid flows through the rocker passage 215 and the screw passage 235 to the lost motion system 300. The fluid pressure may be sufficient to overcome the bias of the check valve 340, and flow into the valve bridge passage 315. Because the check valve 340 provides substantially one-way fluid communication, the hydraulic fluid cannot escape through the check valve back into the screw passage 235. The hydraulic pressure in the valve bridge passage 315 may create a net upward force on the valve bridge 310, causing it to translate upward. The upward motion of the valve bridge 310 applies an upward force against the swivel foot 240, and, in turn, the proximal end of the rocker arm 200. This force is sufficient to overcome the bias of the rocker spring 250 and cause the rocker arm 200 to rotate in a counter-clockwise direction (relative to the view shown in FIG. 4), taking up the lash between the rocker follower 220 and the cam 110. The rocker arm 200 may rotate until the roller follower 220 contacts the cam 110 at base circle. Because of the bias of the piston springs 332, the first and second pistons 330 maintain contact with the engine valves 400.

Because the roller follower 220 is now in contact with the cam 110, as the cam 110 rotates, the motion of the engine braking lobe 114 is imparted to the rocker arm 200. This causes the rocker arm 200 to rotate about the shaft 210 and provide a downward force on the valve bridge 310. This downward force is transferred through the hydraulic pressure in the passage 315 to the slave pistons 330, which, in turn, actuate the engine valves 400 to produce the engine braking valve event.

As the cam 110 continues to rotate, and the roller follower 220 begins to reach the peak of the main event lobe 112, the downward motion of the valve bridge 310 brings the sealing member 354 into contact with the reset plunger 356. The reset plunger 356 forces the sealing member 354 off its seat, allowing hydraulic fluid in the valve bridge 310 to be released. The release of the hydraulic fluid from the valve bridge 310 releases the hydraulic pressure present in the valve bridge, and the additional valve lift created by the hydraulic fluid column in the valve bridge 310 is lost. As the roller follower 220 follows the remainder of the main event lobe 112, motion is transferred through a solid mechanical linkage to the engine valves 400.

Figure 5:
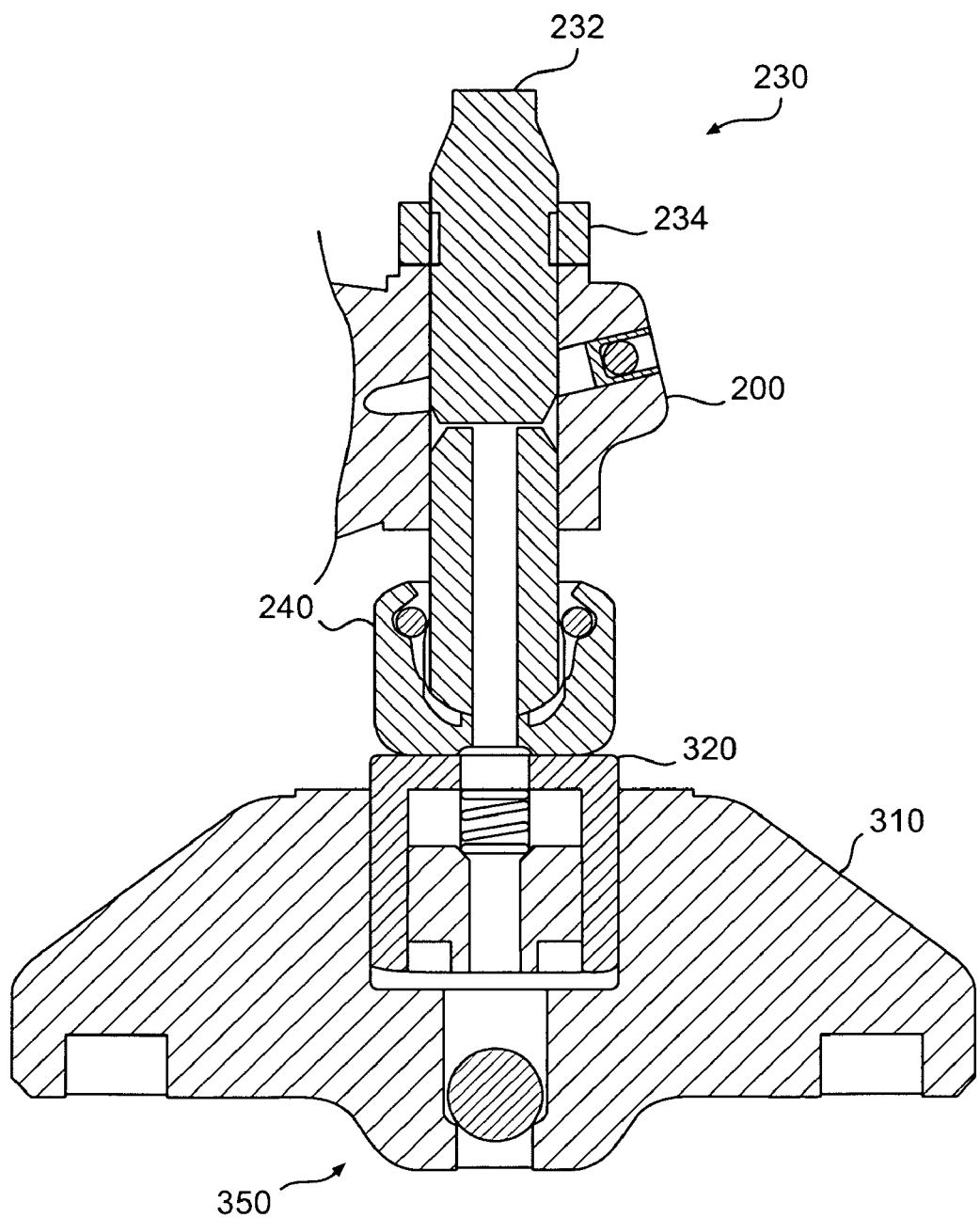
FIG. 5 is a schematic view of an engine valve actuation system including a cross sectional view of a lost motion system in accordance with a fourth embodiment of the present invention.

Another embodiment of the present invention is shown with reference to FIG. 5, in which like reference characters refer to like elements. The lost motion system comprises a master piston 320 slidably disposed in the valve bridge 310. Operation of the embodiment shown in FIG. 5 is substantially the same as described above with reference to FIG. 9. The hydraulic pressure supplied to the valve bridge 310 causes the master piston 320 to extend and apply an upward force against the swivel foot 240, and, in turn, the proximal end of the rocker arm 200, causing the rocker arm 200 to rotate and take up the lash between the rocker follower 220 and the cam 110. As the cam rotates the rocker, the rocker arm acts on the master piston 320. The hydraulic pressure created by the downward motion of the master piston 320 acts on the valve bridge 310 which has direct contact with the engine valve stems. Other embodiments of the lost motion system 300 suitable for selectively transferring the motion of the cam 110 to the engine valve(s) 400 are considered well within the scope and spirit of the present invention.

Figure 12:
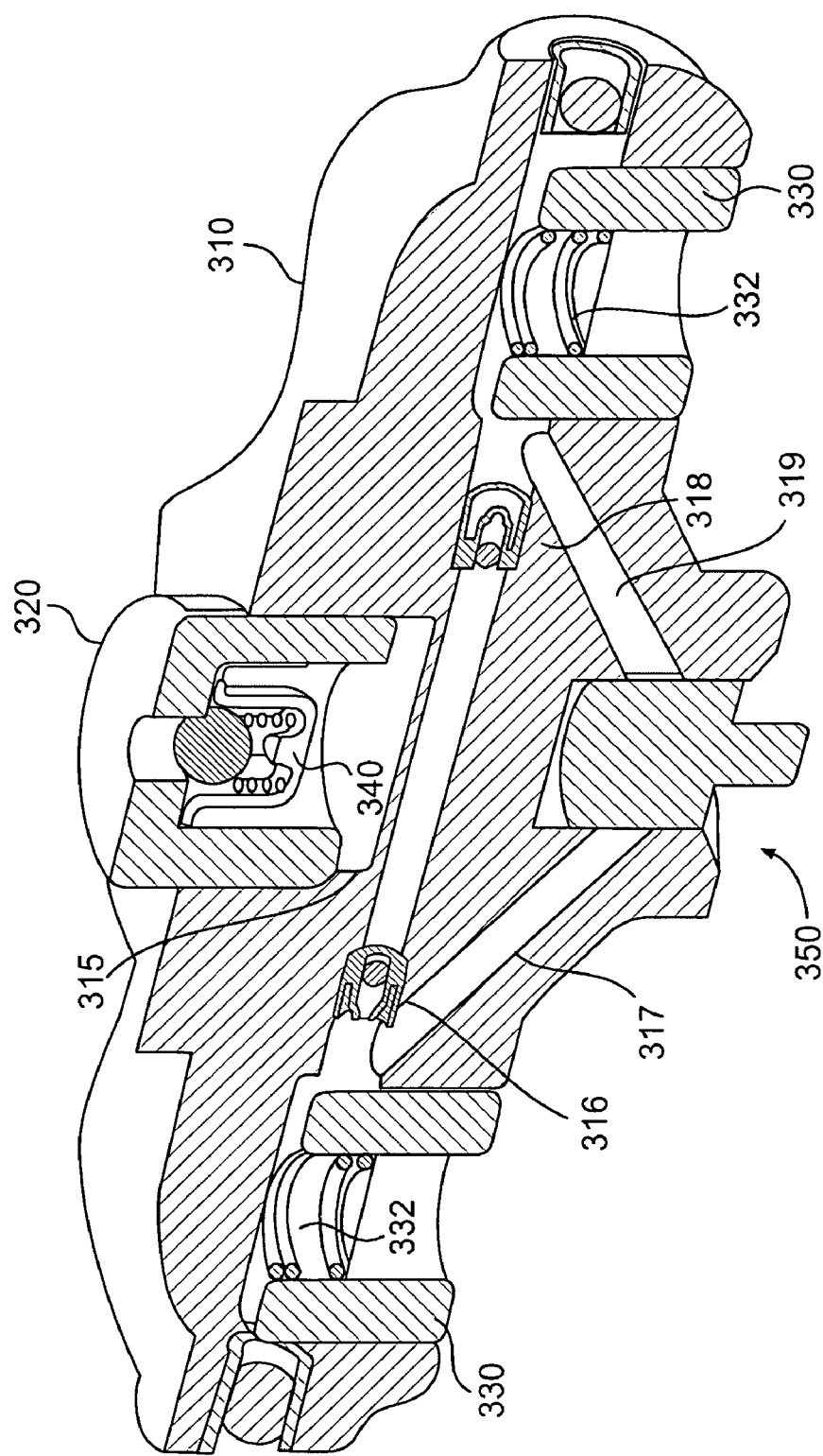
FIG. 12 is a cross sectional view a valve bridge according to an embodiment of the present invention.

Another embodiment of the present invention is shown with reference to FIG. 12, in which like reference characters refer to like elements. First 316 and second 318 check valves may be provided in the valve bridge passage 315. The first 316 and second 318 check valves may primarily allow only one-way fluid communication in the valve bridge passage 315 from the check valve assembly 340 to each of the pistons 330. The valve bridge 310 may further include first 317 and second 319 reset passages formed therein. The first 317 and second 319 reset passages may connect at a first end with the valve bridge passage 315 downstream of the first 316 and second 318 check valves, respectively, and be sealed at a second end by the resetting means 350. In this manner, each of the pistons 330 may operate independently of the other, and may provide for more balanced operation.

Figure 13:
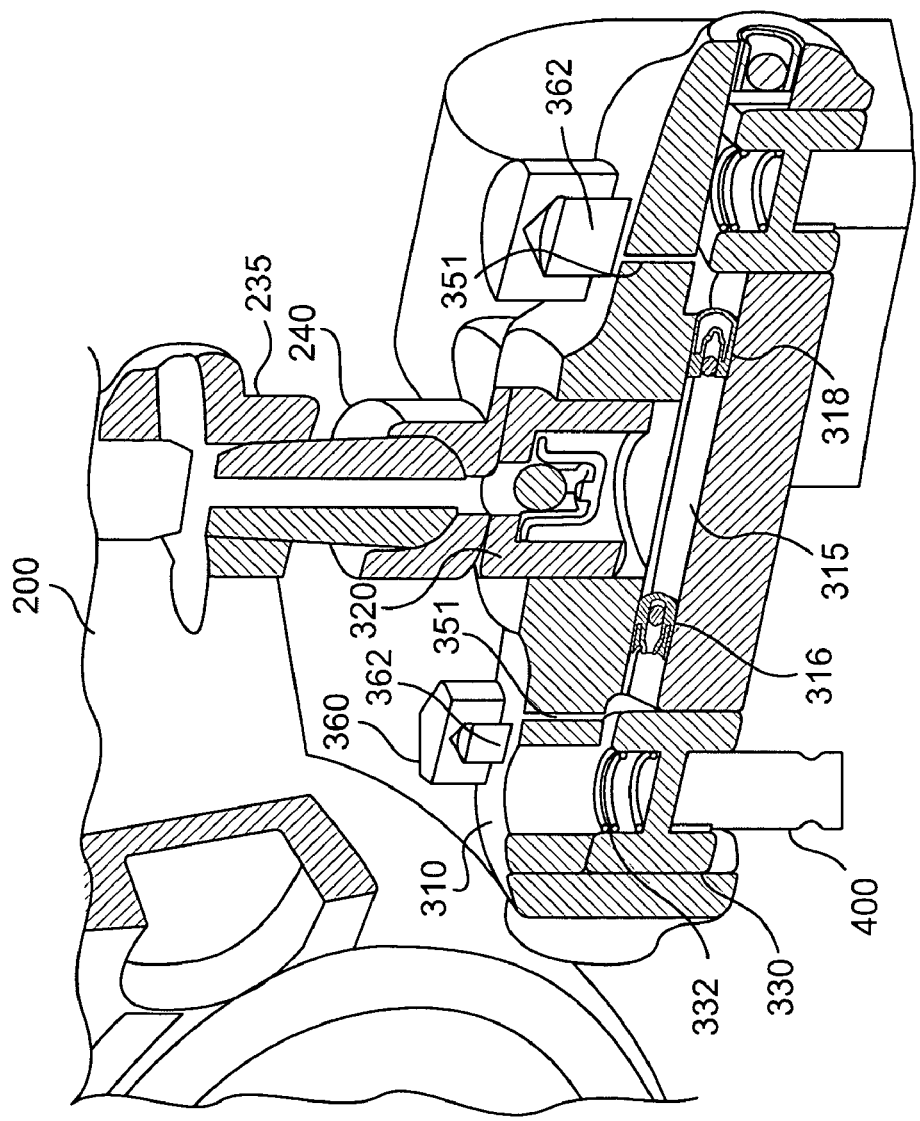
FIG. 13 is a partial cross sectional view of a valve bridge including a bleed hole resetting mechanism in accordance with an embodiment of the present invention.

Another embodiment of the present invention is shown with reference to FIG. 13, in which like reference characters refer to like elements. First and second bleed holes 351 may be formed in the valve bridge 310. The bleed holes 351 communicate with the valve bridge passage 315. The stationary member 360 may include sealing elements 362 adapted to seal the bleed holes 351. The sealing elements 362 may comprise swivel feet adapted to swivel as the valve bridge 310 moves in an upward direction so as to substantially maintain contact with the bridge and the seal with the bleed holes 351.

The embodiment of the present invention shown in FIG. 13 may be operated as follows. When transfer of the motion from the cam to the engine valves 400 is desired, for example, during engine braking, hydraulic fluid is supplied to the valve bridge passage 315 substantially the same as described above with reference to FIG. 9, resulting in a hydraulic lock between the master piston 320 and the slave pistons 330. The hydraulic pressure causes the master piston 320 to extend and apply an upward force against the swivel foot 240, and, in turn, the proximal end of the rocker arm 200. This causes the rocker arm 200 to rotate substantially the same as described above, taking up the lash between the rocker arm and the cam. The hydraulic pressure in the valve bridge passage may also create a net upward force on the valve bridge 310. The stationary member 360 may prevent upward translation of the valve bridge 310, and the sealing elements 362 may substantially maintain contact with the bridge and the seal with the bleed holes 351.

The motion of the engine braking lobe on the cam is imparted to the rocker arm 200. This causes the rocker arm 200 to rotate and provide a downward force on the master piston 320. Subject to the rocker arm motion, the master piston 320 translates downward within its bore in the valve bridge 310. Because of the hydraulic lock in the valve bridge 310, the downward motion of the master piston 320 is transferred through the hydraulic pressure in the passage 315 to the slave pistons 330, which, in turn, move downward and actuate the engine valves 400 to produce the engine braking valve event.

As the cam continues to rotate, the rocker arm 200 begins to rotate and impart the motion of the main event lobe on the master piston 320. Because of the hydraulic lock in the valve bridge 310, the downward motion of the master piston 320 is transferred through the hydraulic pressure in the passage 315 to the slave pistons 330, which, in turn, move downward and actuate the engine valves 400 to produce the main valve event. As the rocker arm 200 acts on the master piston 320, the valve bridge 310 also translates downward. The downward motion of the valve bridge 310 separates the bleed holes 351 from the stationary sealing members 362. This allows hydraulic fluid in the valve bridge passage 315 to be released through the bleed holes 351. The release of the hydraulic fluid from the valve bridge passage 315 causes the master piston 320 and/or the slave pistons 330 to retract from their extended positions, and the additional valve lift created by the hydraulic fluid column in the valve bridge 310 is lost. As the rocker arm 200 follows the remainder of the main event lobe on the cam, motion is transferred through a solid mechanical linkage to the engine valves 400. During engine braking, the engine valves 400 may experience the valve lift profile 410, as shown in FIG. 10.

It will be apparent to those skilled in the art that variations and modifications of the present invention can be made without departing from the scope or spirit of the invention. For example, in another embodiment of the present invention, the motion of the master piston 320 may be transferred to an engine valve through a collapsible tappet assembly. Thus, it is intended that the present invention cover all such modifications and variations of the invention, provided they come within the scope of the appended claims and their equivalents.

What is claimed is:

1. A system for actuating two or more engine valves to produce an engine valve event, said system comprising:
   a movable valve bridge extending between the two or more engine valves, wherein a hydraulic circuit and a hydraulically actuated lost motion component are included in said movable valve bridge; and
   a means for moving the movable valve bridge operatively contacting the movable valve bridge.

2. The system of claim 1, wherein the lost motion component comprises a piston slidably disposed in said movable valve bridge.

3. The system of claim 1, wherein the lost motion component comprises at least two pistons slidably disposed in said movable valve bridge.

4. The system of claim 1, wherein the lost motion component comprises at least three pistons slidably disposed in said movable valve bridge.

5. A valve actuation system comprising:
   a rocker arm;
   an engine valve;
   a movable valve bridge for the engine valve disposed between the rocker arm and the engine valve; and
   means for varying actuation of the engine valve during engine operation, wherein said means for varying is provided at least in part in the movable valve bridge and includes a hydraulic circuit and a hydraulically actuated lost motion component within said movable valve bridge.

6. The system of claim 5, wherein said means for varying comprises a piston slidably disposed in the movable valve bridge.

7. The system of claim 5, wherein said means for varying comprises at least two pistons slidably disposed in the movable valve bridge.

8. The system of claim 5, wherein said means for varying comprises at least three pistons slidably disposed in the movable valve bridge.

9. A system for actuating two or more engine valves in an internal combustion engine to produce an engine valve event, said system comprising:
   motion imparting means;
   a rocker arm pivotally mounted on a shaft and adapted to rotate between a first position and a second position, said rocker arm selectively receiving motion from said motion imparting means;
   a movable valve bridge disposed between said rocker arm and the two or more engine valves;
   one or more hydraulic fluid passages provided in the movable valve bridge; and
   a lost motion system disposed in said movable valve bridge, wherein said lost motion system comprises a first piston and a second piston slidably disposed in the valve bridge and communicating with said one or more hydraulic fluid passages.

10. The system of claim 9, wherein said lost motion system further comprises a third piston slidably disposed in said movable valve bridge.

11. The system of claim 9, further comprising a check valve assembly disposed in a cavity formed in said first piston.

12. The system of claim 9, further comprising an adjustable screw assembly disposed in a first end of said rocker arm.

13. The system of claim 12, further comprising a swivel foot disposed at one end of said screw assembly, said swivel foot contacting said first piston.

14. The system of claim 9, further comprising a spring biasing said rocker arm in the first position.

15. The system of claim 9, further comprising means for resetting the position of the engine valve.

16. The system of claim 15, wherein said resetting means comprises:
   a sealing member disposed in a bore formed in said movable valve bridge;
   a spring biasing said sealing member against a seat formed in said movable valve bridge; and
   a reset plunger in selective contact with said sealing member.

17. The system of claim 16, wherein said sealing member comprises a sealing pin slidably disposed in the movable valve bridge bore.

18. The system of claim 16, wherein said sealing member comprises a check disk.

19. The system of claim 16, wherein said sealing member comprises a check ball.

20. The system of claim 9, wherein the engine valve event comprises an event selected from the group consisting of: a compression release braking event, a bleeder braking event, an exhaust gas recirculation event, a main exhaust event, and a main intake event.

21. The system of claim 9, wherein said lost motion system selectively causes said rocker arm to rotate from the first position to the second position.

22. The system of claim 9, wherein a lash exists between said rocker arm and said motion imparting means when said rocker arm is in the first position.

23. A system for actuating two or more engine valves in an internal combustion engine to produce an engine valve event, said system comprising:
   motion imparting means;
   a rocker arm pivotally mounted on a shaft and adapted to rotate between a first position and a second position, said rocker arm selectively receiving motion from said motion imparting means;
   a movable valve bridge disposed between said rocker arm and the two or more engine valves; and
   a first hydraulically extendable piston slidably disposed in said movable valve bridge,
   wherein said first piston selectively causes said rocker arm to rotate from the first position to the second position.

24. The system of claim 23, further comprising a second piston slidably disposed in said movable valve bridge.

25. The system of claim 23, further comprising means for resetting the position of the engine valve.

26. The system of claim 25, wherein said resetting means comprises:
   a sealing member disposed in a bore formed in said movable valve bridge;
   a spring biasing said sealing member against a seat formed in said movable valve bridge; and
   a reset plunger in selective contact with said sealing member.

27. The system of claim 26, wherein the position of said reset plunger is variable.

28. A system for actuating two or more engine valves to produce an engine valve event, said system comprising:
- a rocker arm pivotally mounted on a shaft and adapted to rotate between a first position and a second position, said rocker arm selectively receiving motion from a valve train element;
- a movable valve bridge for the two or more engine valves;
- one or more hydraulic passages formed in the movable valve bridge; and
- means for varying actuation of the two or more engine valves, wherein said means for varying is provided at least in part in the movable valve bridge and communicates with said one or more hydraulic passages.

29. The system of claim 28, wherein said means for varying comprises a piston slidably disposed in the movable valve bridge.

30. The system of claim 28, wherein said means for varying comprises at least two pistons slidably disposed in the movable valve bridge.

* * * * *